United States Patent [19]
Komachi

[11] Patent Number: 4,947,540
[45] Date of Patent: Aug. 14, 1990

[54] METHOD OF PRODUCING WAVEGUIDE
[75] Inventor: Yuichi Komachi, Akishima, Japan
[73] Assignee: Kabushiki Kaisha Machida Seisakusho, Tokyo, Japan
[21] Appl. No.: 382,288
[22] Filed: Jul. 20, 1989
[30] Foreign Application Priority Data
  Sep. 1, 1988 [JP] Japan .................. 63-216349
[51] Int. Cl.⁵ ........................... H01P 11/00
[52] U.S. Cl. ........................ 29/600; 29/423;
  65/3.15; 65/3.2; 65/3.3; 156/257; 156/663;
  333/239; 333/240; 333/241; 427/163
[58] Field of Search ............... 29/600, 423; 333/239,
  333/240, 241, 242; 156/257, 663; 65/3.15, 3.2,
  3.3, 3.43, 3.44; 427/163

[56] References Cited
U.S. PATENT DOCUMENTS
3,290,762 12/1966 Ayuzawa et al. .............. 29/600
3,566,516  2/1971 Sawada et al. .............. 29/600 X
3,810,302  5/1974 Broers et al. ................ 29/600
4,115,916  9/1978 Meyerhoff .................. 29/600 X FOREIGN PATENT DOCUMENTS
57-13412  1/1982 Japan .
60-140202 7/1985 Japan .
61-79303  4/1986 Japan ...................... 29/600
61-141204 6/1986 Japan ...................... 29/600
61-188506 8/1986 Japan .
61-233705 10/1986 Japan .
61-238104 10/1986 Japan ..................... 29/600

Primary Examiner—Carl E. Hall
Assistant Examiner—Carl J. Arbes
Attorney, Agent, or Firm—Wegner & Bretschneider

[57] ABSTRACT

In the production of a waveguide, a pipe of a glass which is soluble in an acid or an alkali is used in order to obtain a smooth inner peripheral surface of a reflecting layer of the waveguide. After the reflecting layer is formed on the outer periphery of the pipe, the glass pipe is dipped in an etchant to be dissolved and removed. A reinforcement layer can be applied to the waveguide, and the reinforcement layer is made of a resin in order to keep the flexibility of the waveguide. In this case, the reinforcement layer of a resin is formed on the outer periphery of the reflecting layer on the pipe, and thereafter the pipe is dipped in the etchant and is removed. The waveguide of a circular cross-section can be flatted. In this case, the reinforcement layer made of a thermoplastic resin is heated to be softened, and then a compressive force is applied to the waveguide radially thereof to flatten the waveguide.

11 Claims, 2 Drawing Sheets

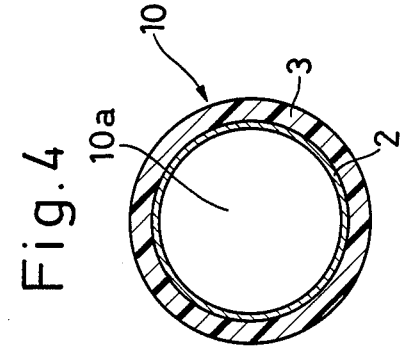
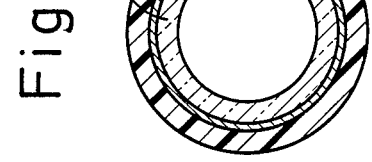
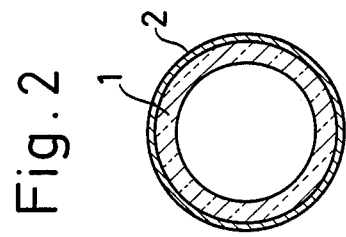
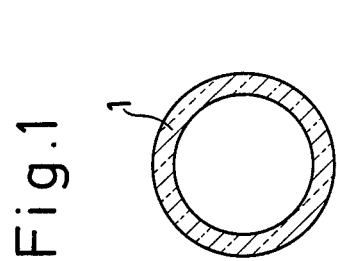
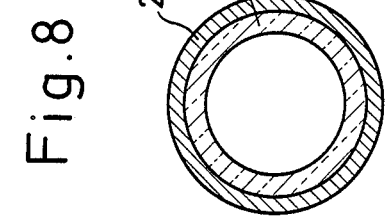
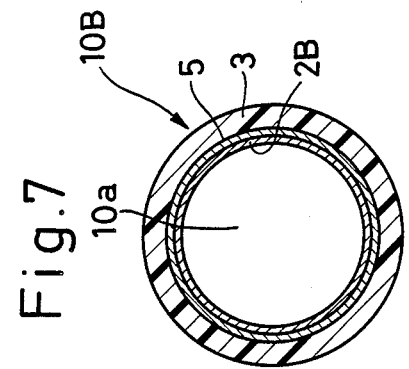
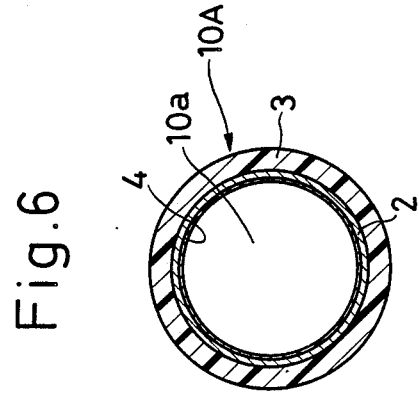
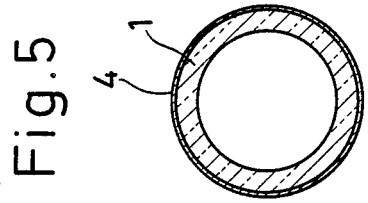

METHOD OF PRODUCING WAVEGUIDE

BACKGROUND OF THE INVENTION

This invention relates to a method of producing a waveguide for transmitting various kinds of lights such as infrared light and far infrared light including carbon dioxide laser light.

A carbon dioxide laser has been used as a surgical laser knife in the medical field and used for welding and cutting materials in many fields of the industry. A general method of producing a waveguide for transmitting carbon dioxide laser light is described in the Prior Art section of Japanese Laid-Open (Kokai) Patent Application No. 188506/86. More specifically, a thin layer of germanium (dielectric layer) is formed on an outer peripheral surface of an aluminum pipe by sputtering, and then a nickel layer (reflecting layer) is formed on the germanium layer by plating. Thereafter, the aluminum pipe is dissolved and removed by an etchant, composed of sodium hydroxide, to provide a waveguide which is composed of the inner layer of germanium and the outer layer of nickel. The cross-sectionally circular central bore of the waveguide defined by the inner peripheral surface of the germanium layer serves as a waveguide path.

In the waveguide produced by the above conventional method, the inner peripheral surface of the nickel layer serves as a reflecting surface which reflects and transmits light, and the germanium layer cooperates with the inner peripheral surface of the nickel layer to enhance the efficiency of reflection.

Transmission characteristics of the laser depends on the smoothness of the inner peripheral surface of the nickel layer. Therefore, the inner peripheral surface of the nickel layer must be smooth. To achieve this, the outer peripheral surface of the pipe must be rendered smooth by polishing.

However, in the case of polishing the pipe of aluminum, the smoothness of the polished surface is limited, and the surface can be polished to a surface roughness of about 0.02 $\mu Rz$ at best, and therefore it is difficult to reduce a transmission loss satisfactorily. Also, in the case where the pipe is narrow, that is, small in diameter, there is encountered another problem that it is difficult to polish or abrade the pipe because of its reduced strength. Further, the nickel layer formed by plating is relative thick so that it can withstand a bending force or the like, and therefore the nickel layer is disadvantageous in that it is not sufficiently flexible.

In the above-mentioned Japanese Laid-Open Patent Application No. 188506/86, there is disclosed a method of producing a waveguide in which an electrically-conductive plastics tube is used as a reinforcement layer, and a metallic reflecting layer and a dielectric layer are formed on the inner peripheral surface of the plastics tube by plating. In such a waveguide, the metallic reflecting layer can be made thin since the waveguide is reinforced by the plastics tube, and therefore the waveguide is excellent in flexibility. However, in the case where the plastics tube is narrow, it is difficult to form the reflecting layer on the inner peripheral surface of the plastics tube by plating.

In order to reduce the transmission loss, waveguides having a rectangular cross-section or an oval cross-section have been proposed. In use of such a waveguide, laser light is deflected in such a manner that the direction of the electric field coincides with the longer axis of the cross-section of the central bore of the waveguide.

Japanese Laid-Open Patent Application Nos. 13412/82 and 140202/85 disclose a method of producing a waveguide in which a plurality of elongated metallic plates each having a mirror surface at its inner side are connected together by welding, by an elastic tube surrounding the metallic plates, or by fitting one metallic plate on another, to thereby provide the waveguide of a rectangular cross-section. In such a conventional waveguide, it is difficult to highly precisely position the metallic plates with respect to one another, and the manufacturing cost is rather high, and the waveguide is inferior in flexibility.

Japanese Laid-Open Patent Application No. 233705/86 discloses a waveguide comprising a metallic pipe of an oval cross-section, the inner peripheral surface of the metallic pipe serving as a reflecting surface. This conventional waveguide is also inferior in flexibility.

SUMMARY OF THE INVENTION

It is therefore an object of this invention to provide a method of producing a waveguide which has a reflecting layer having a very smooth inner peripheral surface, and can be easily manufactured at low costs.

Another object of the invention is to provide a method of producing a waveguide which is flexible and can be easily manufactured at low costs.

A further object of the invention is to provide a method of producing a waveguide which is generally flat in shape and can be easily manufactured at low costs.

According to the present invention, there is provided a method of producing a waveguide comprising the steps of:

(a) forming a reflecting layer on an entire outer periphery of a pipe of glass which is soluble; and (b) subsequently dipping the pipe with the reflecting layer in an etchant to dissolve and remove the pipe, thereby providing the waveguide formed by the reflecting layer, the waveguide having a central bore which is disposed radially inwardly of the reflecting layer and serves as a waveguide path.

BRIEF DESCRIPTION OF THE DRAWINGS

FIG. 1 is a cross-sectional view of a glass pipe used for the production of a waveguide of the present invention;

FIGS. 2 and 3 are cross-sectional views of intermediate products of the waveguide, respectively;

FIG. 4 is a cross-sectional view of the waveguide (finish product);

FIG. 5 is a cross-sectional view of an intermediate product of a modified waveguide;

FIG. 6 is a cross-sectional view of the modified waveguide (finish product);

FIG. 7 is a cross-sectional view of another modified waveguide;

FIG. 8 is a cross-sectional view of an intermediate product of a further modified waveguide;

DESCRIPTION OF THE PREFERRED EMBODIMENTS OF THE INVENTION

Figure 9:
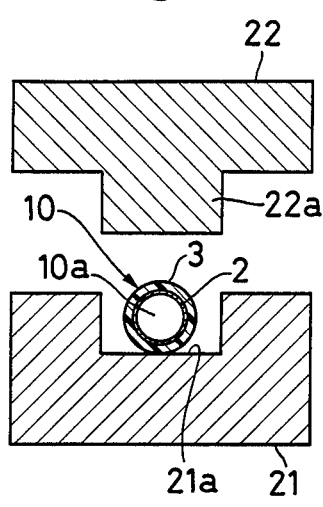
FIG. 9 is a cross-sectional view of forming dies for forming a flat-type waveguide.

A method of producing a waveguide for transmitting carbon dioxide laser light, provided in accordance with the present invention, will now be described.

First, as shown in FIG. 1, there is prepared a pipe 1 of glass. The glass pipe 1 is produced by a conventional method, such as blowing and a Danner method. The outer peripheral surface of the glass pipe 1 is very smooth, and its smoothness is far superior to that of a polished surface of a conventional aluminum pipe.

As described later, the glass pipe 1 is dissolved and removed at a final stage of the production process. Therefore, the pipe is made, for example, of $PbO\text{-}Na_2O$ glass, $B_2O_3\text{-}Na_2O$ glass, $SiO_2\text{-}B_2O_3\text{-}BaO$ glass, $P_2O_5\text{-}Na_2O$ glass, or $SiO_2\text{-}NaO$ glass. Such glass materials are soluble in an acid or an alkali.

Next, as shown in FIG. 2, a metal having a high reflectance, such as gold (Au), silver (Ag), copper (Cu) and nickel (Ni), is deposited on the entire outer peripheral surface of the glass pipe 1 by a suitable method, such as vacuum deposition, sputtering and ion-plating, to form a reflecting layer 2 on the outer peripheral surface of the glass pipe 1.

Then, the glass pipe 1 with the reflecting layer 2 is inserted into a tube of a heat-shrinkable resin, and then heat is applied to this tube, so that the tube is shrunk radially to be tightly fitted on the reflecting layer 2. This shrunk tube serves as a reinforcement layer 3 (see FIG. 3). Thus, the reinforcement layer 3 can be very easily provided. Examples of the heat-shrinkable resin of which the tube is made include a thermosetting resin, such as an epoxy resin, a polyester resin, a phenolic resin, an acrylic resin, a melamine resin and a polyimide resin, and a thermoplastic resin, such as a fluorine resin and a polyamide resin.

Preferably, an adhesive made, for example, of an epoxy resin is applied to at least one of the outer peripheral surface of the reflecting layer 2 and the inner peripheral surface of the heat-shrinkable tube before the glass pipe 1 with the reflecting layer 2 is inserted into the tube. With this arrangement, the reflecting layer 2 is positively retained on the reinforcement layer 3 by the adhesive when the tube is heat-shrunk.

After the reflecting layer 2 and the reinforcement layer 3 are formed on the outer peripheral surface of the glass pipe 1 as described above, the pipe 1 is dissolved and removed by dipping the pipe 1 in an etchant which is, for example, an acid such as nitric acid or an aqueous alkali solution. The acid or the alkali used here is of the type which will not dissolve the reflecting layer 2 and the reinforcement layer 3.

As a result, a waveguide 10 shown in FIG. 4 is produced. The waveguide 10 is composed of the reinforcement layer 3 of the resin and the reflecting layer 2 disposed inwardly of the reinforcement layer 3. The cross-sectionally circular central bore 10a of the waveguide 10 defined by inner peripheral surface of the reflecting layer 2 serves as a waveguide path. Laser light is introduced into the waveguide 10 from its one end, and is passed through the central bore 10a, and is discharged from the other end of the waveguide 10. The laser light is reflected by the inner peripheral surface of the reflecting layer 2 while it passes through the central bore 10a.

The dimensions or sizes of the parts used for the production of the waveguide 10 will now be specifically described. The glass pipe 10 has an inner diameter of 1.0 mm, an outer diameter of 1.5 mm and a thickness of 0.25 mm. It is preferred that the thickness of the reflecting layer 2 should be in the range of between 5 $\mu$m and 100 $\mu$m. If the thickness of the reflecting layer 2 is less than 5 $\mu$m, the mechanical strength of the reflecting layer 2 is reduced. On the other hand, if the thickness of the reflecting layer 2 is more than 100 $\mu$m, the flexibility of the reflecting layer 2 is reduced. The reinforcement layer 3 of the resin has a thickness of about 1 mm.

For comparison purposes, there were prepared a waveguide of the present invention (hereinafter referred to as "present waveguide") and a comparative waveguide according to the procedure, described above for the waveguide 10 of the present invention, except that a pipe for the comparative waveguide is made of aluminum. More specifically, the glass pipe for the present waveguide was produced by a Danner method, and a surface roughness of the outer peripheral surface of the glass pipe was measured. This surface roughness was 0.000035 $\mu$Rz. The outer peripheral surface of the aluminum pipe of the same size was polished, and its surface roughness was measured. The surface roughness of the polished surface was 0.023 $\mu$Rz. A reflecting layer of gold was formed on each of the glass pipe and the aluminum pipe, and then a heat-shrinkable tube is tightly fitted on the reflecting layer to form a reinforcement layer. Then, the pipes were dissolved and removed to provide the present waveguide and the comparative waveguide. The reflectance of the inner peripheral surface of the reflecting layer of each waveguide was measured. As a result, with respect to the comparative waveguide employing the aluminum pipe, the reflectance was 75% whereas with respect to the present waveguide employing the glass pipe, the reflectance was 96%. From this, it will be appreciated that the use of the glass pipe can markedly reduce the transmission loss.

Also, the use of the glass pipe obviates the need for processing or working the pipe, such as a polishing operation. Therefore, the method according to the present invention can be more easily carried out as compared with the conventional methods, and the waveguide can be produced at lower costs. Further, with the method of the present invention, since there is no need to process the outer peripheral surface of the pipe, the pipe can be narrower, so that the waveguide of a small diameter can be easily produced.

In the waveguide 10 shown in FIG. 4, the reflecting layer 2 of metal is thin, and the reinforcement layer 3 is made of a resin as described above. Therefore, this waveguide 10 is flexible.

A method of producing a modified waveguide will now be described with reference to FIGS. 5 and 6. As shown in FIG. 5, a dielectric layer 4 is formed on an entire outer peripheral surface of a pipe 1 of glass by a suitable method such as vacuum deposition, sputtering and ion-plating, the dielectric layer 4 being made, for example, of germanium, and having a thickness of about 0.4 $\mu$m. Then, the formation of a reflecting layer 2 on the outer periphery of the dielectric layer 4, the formation of a reinforcement layer 3 on the outer periphery of the reflecting layer 2 and the removal of the glass pipe 1 are carried out in the manner as described above for the waveguide 10 of the preceding embodiment, thereby providing a waveguide 10A shown in FIG. 6.

The waveguide 10A comprises the reinforcement layer 3, the reflecting layer 2 and the dielectric layer 4 arranged in this order from its outer side to its inner side. The waveguide 10A has a central bore 10a defined by the inner peripheral surface of the dielectric layer 4. The dielectric layer 4 allows transmission light to pass therethrough, and cooperates with the reflecting layer 2 to enhance the efficiency of the reflection. Since the effects of the dielectric layer 4 are well known and are described in the above-mentioned prior art publications, a detailed description of such effects is omitted here.

Another modified waveguide 10B shown in FIG. 7 differs from the waveguide of FIG. 4 in that a reflecting layer is constituted by a first layer 2B of metal and a second layer 5 of metal. More specifically, the first layer 2B is formed on the entire periphery of the glass pipe 1, for example, by vacuum deposition. The second layer 5 is formed on the entire outer peripheral surface of the first layer 2B, for example, by plating, and the reinforcement resin layer 3 is formed on the entire outer peripheral surface of the second layer 5. The first layer 2B is made, for example, of gold and has a thickness of 1 to 10 $\mu$m. The second layer 5 is made, for example, of nickel and has a thickness of 50 to 100 $\mu$m. The first layer 2B performs a reflecting function, and the second layer 5 performs a reinforcement function. Thus, the waveguide 10B comprises the reinforcement resin layer 3, the second layer 5 and the first layer 2B arranged in this order from its outer side to its inner side. The waveguide 10B has a central bore 10a defined by the inner peripheral surface of the first layer 2.

According to a further modified form of the invention, a reflecting layer 2C, which is greater in thickness than the reflecting layer 2 of FIG. 2 and has, for example, a thickness of about 0.1 mm to 0.2 mm, is formed on the entire outer peripheral surface of the glass pipe 1, as shown in FIG. 8, and the use of a reinforcement layer is omitted. In this case, when the pipe 1 is removed, there is provided a waveguide composed solely of the reflecting layer 2C. This waveguide is inferior in flexibility, but has good transmission characteristics, and therefore achieves the first object of this invention.

A dielectric layer may be additionally provided as an innermost layer of each of the waveguides shown respectively in FIGS. 7 and 8, as is the case with the waveguides of FIG. 6.

When thinking much of the advantage of facilitating the formation of the resin layer by the heat-shrinkable tube, for example, an aluminum pipe may be used instead of the glass pipe in the waveguide production methods shown respectively in FIGS. 1 to 4, FIGS. 5 and 6 and FIG. 7, as is the case with the conventional method. When the aluminum pipe is used, an aqueous solution of sodium hydroxide is used as an etchant.

Figure 10:
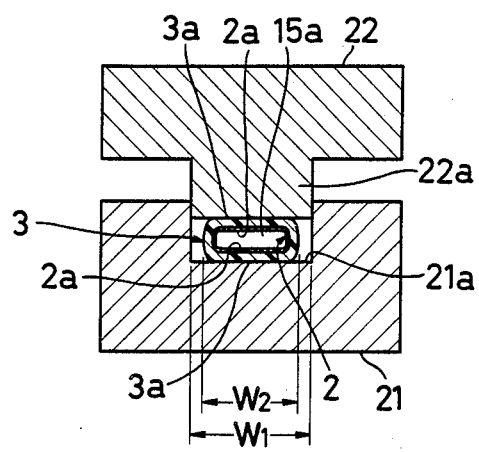
FIG. 10 is a cross-sectional views of the forming dies as shown in their operative condition.

Next, a method of producing a flat-type waveguide, for example, of a generally rectangular cross-section will now be described with reference to FIGS. 9 and 10. As one example, a method of producing such a flat-type waveguide from the waveguide 10 of a circular cross-section shown in FIG. 4 will now be described. In this case, it is necessary that the reinforcement layer 3 should be made of a thermoplastic resin. More specifically, the reinforcement layer 3 is heated into a softened condition, and in this condition the waveguide 10 is pressed or shaped using a pair of first and second forming dies 21 and 22 slightly longer than the waveguide 10 (see FIG. 9). The first die 21 has an elongated recess 21a of a rectangular cross-section extending along its length. The second die 22 has an elongated projection 22a of a rectangular cross-section disposed in opposed relation to the recess 21a and extending along the length of the second die 22. The projection 22a is disposed in registry with and is complementary in shape to the recess 21a, and the distal surface of the projection 22a facing the recess 21a is disposed parallel to the bottom surface of the recess 21a. As shown in FIG. 10, when one of the two dies 21 and 22 is moved relative to the other, the projection 22a is fitted in the recess 21a to a predetermined depth, so that the reinforcement layer 3 is compressed or shaped to have a pair of parallel walls 3a and 3a extending respectively along the bottom surface of the recess 21a and the distal surface of the projection 22a in contiguous relation thereto. At the same time, similarly, the reflecting layer 2 is shaped to have a pair of parallel opposed flat portions 2a and 2a. The central bore 15a of the thus shaped waveguide defined by the inner peripheral surface of the reflecting layer 2 has a generally rectangular cross-section.

In order to reduce a loss of the transmission of laser light, it is important that the pair of flat portions 2a and 2a should be made flat and parallel to each other with high precision. To achieve this, the opposite ends of the cross-sectionally circular central bore 10a of the waveguide 10 are closed by a suitable resin or suitable closure members before the above pressing or shaping operation is carried out. In this condition, when the above pressing operation is carried out, the volume of the central bore 10a is gradually decreased so as to compress the air within the central bore 10a, as the cross-section of the central bore 10a is gradually changed from a circular shape to a flattened shape. As a result, the outer peripheral surface of the reinforcement layer 3 is held in intimate contact with the bottom surface of the recess 21a and the distal surface of the projection 22a, so that the flatness and parallelism of the walls 3a and 3a of the reinforcement layer 3 are highly precise, and therefore the flatness and parallelism of the flat portions 2a and 2a of the reflecting layer 2 are also highly precise. The closed opposite ends of the waveguide are cut off after the pressing operation.

In this embodiment, since the width W1 of the recess 21a is greater than the width W2 of the flattened waveguide (final product), transverse forces are not applied to the waveguide 10 in FIG. 10. Therefore, the flatness and parallelism of the walls 3a and 3a of the reinforcement layer 3 as well as the flatness and parallelism of the flat portions 2a and 2a of the reflecting layer 2 is not affected. The opposite sides of the flattened waveguide are not flat but curved; however, this causes no problem with transmission characteristics.

Figure 11:
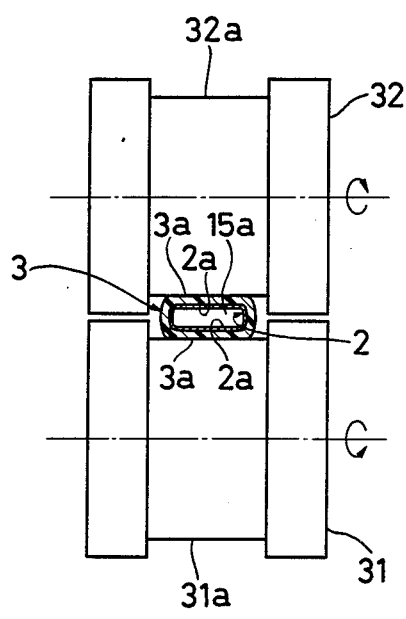
FIG. 11 is a cross-sectional view of forming rolls for forming a flat-type waveguide.
Figure 12:
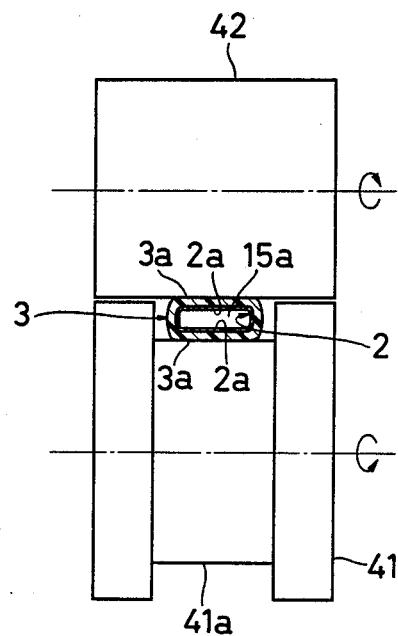
FIG. 12 is a cross-sectional view of modified forming rolls for forming a flat-type waveguide.

According to a modified form of the invention shown in FIG. 11, the waveguide 10 of a circular cross-section is shaped into a flattened cross-section, using a pair of forming rolls 31 and 32 having annular peripheral grooves 31a and 32a, respectively. The waveguide 10 is pressed between the opposed bottom surfaces of the peripheral grooves 31a and 32a. This method is particularly useful in the case where the waveguide is relatively long. In the case where the waveguide is particularly long, a plurality of pairs of forming rolls can be provided in a multistage manner so as to gradually increase the degree of the processing. Also, according to another modified form of the invention shown in FIG. 12, an annular peripheral groove 41a is formed in one of pair of forming rolls 41 and 42 (for example, in the forming roll 41). The other forming roll 42 has a cylindrical peripheral surface. In this case, the waveguide 10 is received in the groove 41a.

With the above methods of producing the flat-type waveguide, such a waveguide can be more easily produced than with the conventional method in which a plurality of metal plates are combined together to provide a flat-type waveguide. Therefore, the production costs can be much reduced. Another advantage is that the waveguide is excellent in flexibility because the reinforcement layer is made of a resin. Utilizing the above methods of the present invention, a waveguide of an oval cross-section can be produced. In this case, grooves having respective cross-sections corresponding respectively to halves of an oval shape are formed respectively in the opposed surfaces of a pair of forming dies. Alternatively, annular grooves having respective cross-sections corresponding respectively to halves of an oval shape are formed respectively in peripheral surfaces of a pair of forming rolls.

In the flat-type waveguide-producing methods described above with respect to FIGS. 9 to 12, the waveguide 10A of FIG. 6 or the waveguide 10B of FIG. 7 can be used instead of the waveguide 10 of FIG. 4.

When producing such a flattened waveguide, the reinforcement resin layer does not always need to comprise a heat-shrinkable tube, and the only requirement for the reinforcement layer is that it should be made of a thermoplastic resin.

What is claimed is:

1. A method of producing a waveguide comprising the steps of:
   (a) forming a reflecting layer on an entire outer periphery of a core of glass which is soluble; and
   (b) subsequently dipping said core with said reflecting layer in an etchant to dissolve and remove said pipe, thereby providing the waveguide formed by said reflecting layer, said waveguide having a central bore which is disposed radially inwardly of said reflecting layer and serves as a waveguide path.

2. A method according to claim 1, further comprising the step of forming a reinforcement layer of a resin on the outer periphery of said reflecting layer.

3. A method according to claim 1, wherein the core takes the form of a pipe of a circular cross-section.

4. A method of producing a waveguide comprising the steps of:
   (a) forming a reflecting layer on an outer periphery of a core which is soluble;
   (b) inserting the core with the reflecting layer thereon into a tube of a heat-shrinkable resin;
   (c) subsequently forming a reinforcement layer of the resin on the outer periphery of the reflecting layer by heat-shrinking the tube radially into intimate contact with the reflecting layer; and
   (d) thereafter dipping the core with the reinforcement layer and the reflecting layer formed thereon in an etchant to dissolve and remove the core, thereby providing the waveguide formed by the reinforcement layer and the reflecting layer, the waveguide having a central bore which is disposed radially inwardly of the dielectric layer and serves as a waveguide path.

5. A method according to claim 4, in which a first layer of metal is formed on the entire outer periphery of said pipe, a second layer of metal being formed on an entire outer periphery of said first layer, and said reflecting layer comprising said first and second layers.

6. A method according to claim 5, in which said first layer is formed by vacuum deposition, said second layer being formed by plating.

7. A method of producing a generally flat-type waveguide comprising the steps of:
   (a) forming a reflecting layer on an outer periphery of a core of a circular cross-section which is soluble;
   (b) forming a reinforcement layer of a thermoplastic resin on an outer periphery of said reflecting layer;
   (c) subsequently dipping said pipe with said reflecting layer and said reinforcement layer in an etchant to dissolve and remove said core, thereby providing a waveguide of a circular cross-section formed by said reflecting layer and said reinforcement layer, said waveguide having a central bore which is disposed radially inwardly of said reflecting layer and serves as a waveguide path; and
   (d) subsequently heating said reinforcement layer to soften it, and applying a compressive force to said waveguide of a circular cross-section radially of said waveguide to flatten said reflecting layer and said reinforcement layer, thereby providing the flat-type waveguide.

8. A method according to claim 7, in which opposite ends of said central bore of said waveguide of a circular cross-section are closed when the compressive force is applied to said waveguide.

9. A method of producing a waveguide comprising the steps of:
   (a) forming a dielectric layer on an outer periphery of a core of glass which is soluble;
   (b) subsequently forming a reflecting layer on an outer periphery of the dielectric layer; and
   (c) thereafter dipping the core with the dielectric layer and the reflecting layer formed thereon in an etchant to dissolve and remove the core, thereby providing the waveguide formed by the dielectric layer and reflecting layer, the waveguide having a central bore which is disposed radially inwardly of the dielectric layer and serves as a waveguide path, the dielectric layer and the reflecting layer cooperating to enhance the efficiency of reflection.

10. A method according to claim 9, further comprising a step (d) of forming a reinforcement layer of a resin on the outer periphery of the reflecting layer.

11. A method of producing a waveguide comprising the steps of:
    (a) forming a reflecting layer on an outer periphery of a core which is soluble;
    (b) applying an adhesive to at least one of an outer peripheral surface of the reflecting layer and an inner peripheral surface of a tube of a heat-shrinkable resin;
    (c) inserting the core with the reflecting layer thereon into the tube;
    (d) subsequently forming a reinforcement layer of the resin on the outer periphery of the reflecting layer by heat-shrinking the tube radially into intimate contact with the reflecting layer; and
    (e) thereafter dipping the core with the reinforcement layer and the reflecting layer formed thereon in an etchant to dissolve and remove the core, thereby providing the waveguide formed by the reinforcement layer and the reflecting layer, the waveguide having a central bore which is disposed radially inwardly of the dielectric layer and serves as a waveguide path.

* * * * *

UNITED STATES PATENT AND TRADEMARK OFFICE
CERTIFICATE OF CORRECTION

PATENT NO. : 4,947,540

DATED : August 14, 1990

INVENTOR(S) : Yuichi Komachi

It is certified that error appears in the above-identified patent and that said Letters Patent is hereby corrected as shown below:

Column 7, line 32, delete "entire".
Column 7, line 36, change "pipe" to --core--.
Column 7, line 66, change "pipe" to --core--.
Column 7, line 62, change "dielectric" to --reflecting--.
Column 8, line 66, change "dielectric" to --reflecting--.

Signed and Sealed this

Twenty-fifth Day of May, 1993

Attest:

MICHAEL K. KIRK

*Attesting Officer*

*Acting Commissioner of Patents and Trademarks*